United States Patent
Lin

(10) Patent No.: US 12,206,302 B2
(45) Date of Patent: Jan. 21, 2025

(54) INDUCTION MOTOR WITH IN SITU SLIP POWER RECOVERY

(71) Applicants: Pan-Chien Lin, Chunglin (TW); Teng-Chang Chang, Taipei (TW)

(72) Inventor: Pan-Chien Lin, Chunglin (TW)

(73) Assignees: Pan-Chien Lin, Chunglin (TW); Teng-Chang Chang, Taipei (TW)

( * ) Notice: Subject to any disclaimer, the term of this patent is extended or adjusted under 35 U.S.C. 154(b) by 0 days.

(21) Appl. No.: 18/228,858

(22) Filed: Aug. 1, 2023

(65) Prior Publication Data
US 2024/0048033 A1 Feb. 8, 2024

Related U.S. Application Data

(60) Provisional application No. 63/395,001, filed on Aug. 4, 2022.

(51) Int. Cl.
*H02K 17/00* (2006.01)
*H02K 17/04* (2006.01)
*H02K 17/14* (2006.01)

(52) U.S. Cl.
CPC .............. *H02K 17/14* (2013.01); *H02K 17/04* (2013.01)

(58) Field of Classification Search
CPC ........................................ H02K 17/00–17/44
See application file for complete search history.

(56) References Cited

U.S. PATENT DOCUMENTS

| | | | | |
|---|---|---|---|---|
| 3,526,816 | A * | 9/1970 | Paice | H02P 25/26 318/771 |
| 6,566,764 | B2 * | 5/2003 | Rebsdorf | F03D 7/0284 290/55 |
| 9,729,099 | B1 * | 8/2017 | Lovas | H02P 23/07 |
| 2005/0269892 | A1 * | 12/2005 | Duff, Jr. | H02K 17/18 310/212 |
| 2022/0399838 | A1 * | 12/2022 | Nashiki | H02P 23/009 |

* cited by examiner

*Primary Examiner* — Ramon M Barrera
(74) *Attorney, Agent, or Firm* — ALLEN, DYER, DOPPELT + GILCHRIST, P.A.

(57) ABSTRACT

An induction motor with on-rotor slip power recovery may have a rotor and a stator element. The rotor element has a rotor winding system with a number of winding units wound-distributed for inducing a rotor magnetic field. Each winding unit has an induction and an augmentation subwinding. The induction subwinding has two legs of each a number of induction conductor segments. The induction subwinding induces an emf that drives a rotor current in the rotor winding system to generate a basic induction component for the rotor magnetic field when the induction conductor segments move in the stator element. The augmentation subwinding has two legs of each a number of augmentation conductor segments aligned parallel to the induction conductor segments. The augmentation subwinding being wound that the two legs of augmentation conductor segments are immediately next to each other and positioned mid-way between the two legs of induction conductor segments.

9 Claims, 1 Drawing Sheet

INDUCTION MOTOR WITH IN SITU SLIP POWER RECOVERY

FIELD OF THE INVENTION

The present invention relates in general to electric machines and in particular to an induction motor. More particularly the present invention relates to an induction motor with on-rotor slip power recovery through rotor magnetic field self-augmentation for improved mechanical performance and energy efficiency.

BACKGROUND

Induction motor is useful in converting electrical power into mechanical. Generally a so-called induction machine, it is even useful in the reverse use, like the utilization as an induction generator for harnessing wind energy in a wind turbine, or regenerative braking in an electric vehicle. In the case of EV drive train application, the induction machine-based power machine is essentially the same device to work as induction motor when propelling the vehicle and as induction generator when the vehicle implements regenerative braking. Ease of use and low in cost due to simplicity in construction, induction machines become ubiquitous in industrial and domestic applications alike. And most applications are as motors.

Indispensable as it is, grossly induction motor is responsible for a noticeable portion of global energy consumption. Yet, at low-speed end of its operating speed range, induction motor is inherently inefficient in electrical-mechanical power conversion. Internal loss, the slip energy (slip power) in the secondary circuit of an induction motor, either of a squirrel cage (SCIM) or a wound rotor (WRIM) type, is linearly proportional to its slip.

For example, at 90% slip (or 10% synchronous) speed of an induction motor, the efficiency would be lower than 10%. Literally more than nine-tenths of the electrical power fed to the primary winding of the motor and crosses over the air gap into the secondary is burned and lost as heat. This also leads to the problem of thermal stress in the secondary circuit, especially for SCIM. Rotor circuit, the squirrel cage, sometimes along with the insulation coating on silicon steel sheets of the lamination body, is easily destroyed if the motor is not brought up to speed quickly.

To mitigate these problems, one means that helps is employing an inverter to feed the primary circuit instead of driving directly from line. For low-speed operations, an inverter can supply the electrical power at a frequency lower than line. Foe example, the inverter feeds the motor with a 25 Hz AC instead of the line's 60 Hz when the rotor spins at 20 Hz. This lowers slip from 66% to 20% for the same rotor speed when driven by line's 60 Hz. This reduces the proportion of slip energy burned and wasted. The problem of rotor thermal stress is also eased.

However, use of inverter costs. Another solution found in large-power industrial applications is the use of resistance means externally connected to the motor's wound rotor. For this category of industrial WRIM, the proportion of energy otherwise burned and wasted in the squirrel cage of an SCIM can be recovered when proper means is coupled to the rotor circuit. For example, the 54 Hz slip power in the rotor winding of a WRIM fed by a 60 Hz line and operating at 90% slip can be converted into a 60 Hz power using an inverter and fed back to grid or directly back to the stator bus. Or the 54 Hz slip power can be used, for example, to simply heat a tank of water. Yet, again, inverter costs, and simple external heat-dissipating resistor means implies simple applications like water heating.

SUMMARY

It is an object of the present invention to provide an induction motor with self-augmented rotor magnetic field for improved operating energy efficiency.

It is also an object of the present invention to provide an induction motor with on-rotor slip energy/power recovery for improved operating energy efficiency.

The present invention achieves the above and other objects by providing an induction motor having a rotor element and a stator element that sustains a stator rotating magnetic field. The rotor element has a rotor winding system that includes a number of winding units wound-distributed on a cylindrical periphery of a rotor lamination body for inducing a rotor magnetic field. Each of the winding units includes an induction subwinding and an augmentation subwinding.

The induction subwinding has between two induction terminals thereof two legs of each a number of induction conductor segments. The induction subwinding induces an emf across the two induction terminals for causing a rotor current in the rotor winding system that generates a basic induction component for the rotor magnetic field when the induction conductor segments move relative to the stator rotating magnetic field.

The augmentation subwinding has between two augmentation terminals thereof two legs of each a number of augmentation conductor segments aligned substantially parallel to the induction conductor segments. The augmentation subwinding is wound such that the two legs of augmentation conductor segments are immediately next to each other and are positioned substantially mid-way between the two legs of induction conductor segments. The augmentation subwinding is electrically connected to the induction subwinding via the induction and augmentation terminals so as to produce by the rotor current an augmentation component for the rotor magnetic field. The augmentation component is substantially aligned with and oriented toward the same direction of the basic induction component. The augmentation component thereby enhances the field strength of the two-component overall rotor magnetic field.

DETAILED DESCRIPTION

Figure 1:
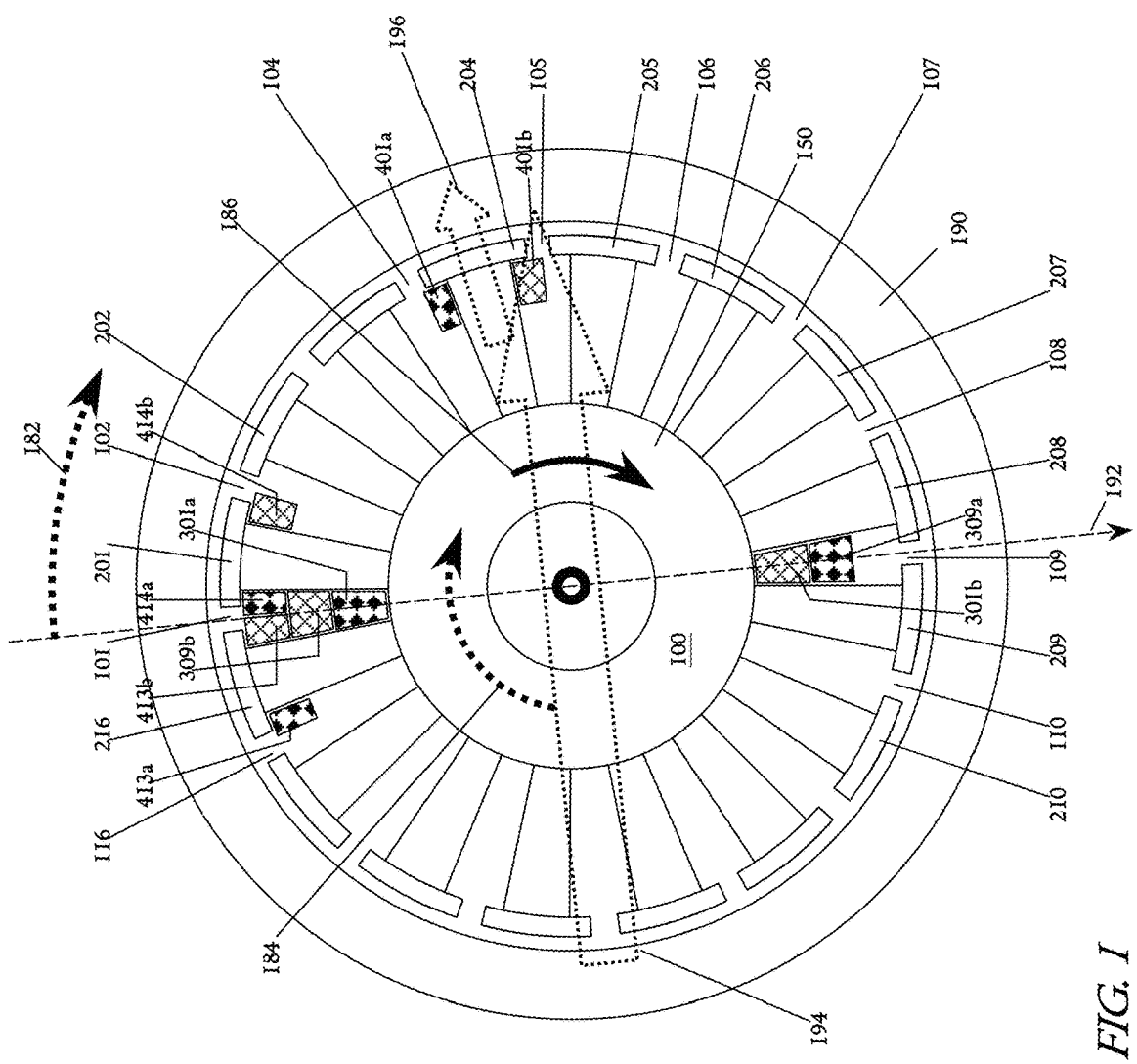
FIG. 1 schematically illustrates the construction of a rotor of an induction motor implementing rotor magnetic field self-augmentation in accordance with a preferred embodiment of the present invention.

FIG. 1 schematically illustrates the construction of a rotor of an induction motor implementing rotor magnetic field self-augmentation in accordance with a preferred embodiment of the present invention. Note that figures in the drawings are illustrative only. All parts and, in particular, the arrows/vectors signifying machine operation, are not drawn to scale.

In FIG. 1, rotor element 100 is installed and rotates inside the stator element 190, which has a stator winding system that receives an electrical power, such as a three phase AC from line, to sustain a stator rotating magnetic field, typically at 60 Hz. Such a rotating magnetic field is illustratively indicated by the stator field axis line 192.

Rotor element 100 has a rotor winding system that includes a number of winding units wound and distributed on the cylindrical periphery of a rotor lamination body 150. Each winding unit has an induction subwinding and an augmentation subwinding.

For example, the induction subwinding of one winding unit has between its two end terminals two legs 301a and 301b. Each leg has a number of induction conductor segments. In the drawing these conductors are illustrated as dots (301a) and crosses (301b), which signify the direction of electric current flowing in these conductors in operation. A dot indicates a current out of the plane, and a cross means current into the plane.

For this particular 301 induction subwinding (not labeled directly in the drawing), its two legs 301a and 301b are wound on the periphery of the rotor lamination body 150. They are spaced 180 degrees apart in slot 101 and 109 respectively. This 301a-301b-paired induction subwinding induces an emf across it two end terminals for causing a rotor current in the rotor winding system when induction conductor segments in the legs move relative to the stator rotating magnetic field signified by axis 192. Among all winding units (a total of 16 in the example of FIG. 1), this generates its basic induction component, which contributes one part for the gross rotor magnetic field.

When the two legs 301a and 301b are directly aligned with the stator magnetic field axis 192, as is in the condition of FIG. 1, their helical winding around the body 150 induces a maximized magnetic field component. As the rotor spins on, the field strength decreases sinusoidally, until they are aligned about 90 degrees with respect to stator field axis 192.

Combined, all the winding units (16 of them) similarly wound grossly induce a main rotor magnetic field, illustratively represented by the dotted arrow 194. Note this rotor field rotates in sync with the stator field, as schematically signified by their respective rotational speed vectors 184 and 182. The rotor element 100 itself would physically be rotating with a slip at a slower speed, indicated by vector 186, as is inherent to an induction motor.

Then, the augmentation subwinding of the very winding unit in FIG. 1 described above has between its pair of end terminals two legs 401a and 401b of each a number of augmentation conductor segments. They are aligned substantially parallel to the induction conductor segments in legs 301a and 301b. These conductors are also illustrated as dots (401a) and crosses (401b), signifying the direction of electric current they carry.

For the 401 (not labeled) augmentation subwinding, its two legs 401a and 401b are wound immediately next to each other on the periphery of the rotor lamination body 150. They are in slot 104 and 105 respectively, and are wound around rotor lobe 204. Legs 401a and 401b making one augmentation subwinding are positioned on the lamination body periphery substantially mid-way between the two legs 301a and 301b of the corresponding induction subwinding.

Augmentation subwinding with legs 401a and 401b is electrically connected to its corresponding induction subwinding with legs 301a and 301b. The connection is via their end terminals so that the rotor current caused by the emf arising in the induction subwinding described above produces, in the augmentation subwinding, an augmentation component 196 for the main rotor magnetic field 194. The augmentation component 196 is substantially aligned with and oriented toward the same direction of the basic induction component in field 194. The augmentation component 196, literally produced by an electromagnet out of legs 401a and 401b, thus enhances the rotor magnetic field strength. Put alternately, the combination of the two-components—induction and augmentation—enhances the overall rotor magnetic field 194.

Figure 2:
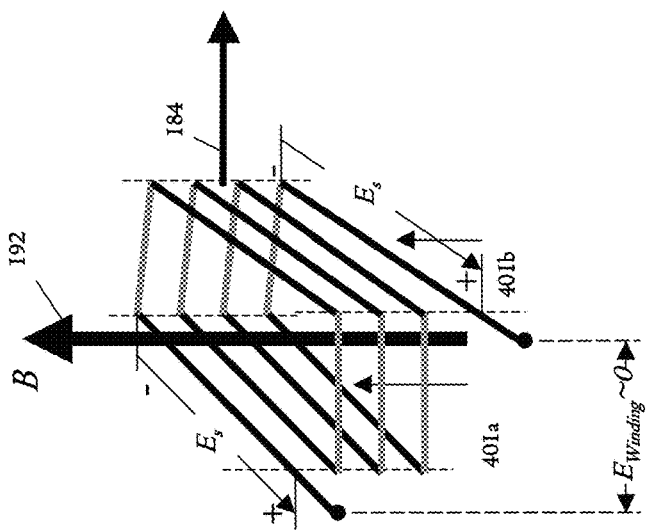
FIG. 2 schematically illustrates how the augmentation subwinding of FIG. 1 may operate with virtually nil counter emf.

FIG. 2 schematically illustrates how the augmentation subwinding 401a and 401b of FIG. 1 may generate virtually nil counter emf. For an augmentation subwinding to enhance the main rotor magnetic field as described above, it needs to act plainly as an electromagnet, even though it has two sets of conductor segments moving inside the stator magnetic field. No counter emf is to interfere with the desired effect of augmentation. This must be true either when the leg pair is directly aligned with the stator rotating magnetic field where the field is strongest or when they are offset 90 degrees where the field is weakest.

Unlike the induction subwinding whose legs 301a and 301b are spaced 180 degrees apart, the two sets of conductor segments in the 401a and 401b legs, each on one side of lobe 204, are immediately close to each other on the cylindrical periphery of the rotor lamination body 150. In FIG. 2, along the length of each of the conductor segments on both legs 401a and 401b, there is induced a small emf $E_s$, all aligned to the same orientation. This is because these parallel segments are all in a close proximity within the stator magnetic field. As a whole, individual emf $E_s$ induced in all conductor segments of the 401a and 401b legs of each half of the augmentation subwinding substantially cancel one another, as their movement 184 is perpendicular to stator magnetic field 192.

Thus the compact spiral winding of the augmentation subwinding results in near-nil counter emf when working. All (16) of the augmentation subwindings then make an electromagnet for the rotor winding system, with individual subwindings generating its augmentation share varying in a sinusoidal pattern. Functionally this electromagnet is similar to the DC-excited electromagnet rotor of a synchronous motor, but with a magnetic field axis that shifts relative to the physical rotor body. This virtual electromagnet generates a magnetic field that is in sync and aligned with the main rotor magnetic field, thereby augmenting the overall strength of rotor magnetic system. Ultimately, the rotor slip power appearing as rotor current that otherwise is burned can now be recovered useful.

While the above is a full description of a specific preferred embodiment, various modifications, alternative constructions and equivalents may be used. For example, an induction motor according to the present invention operating a stator rotating magnetic field having more than one pair of magnetic poles can be constructed. Four, six, eight or more poles are possible when the rotor winding system is adjusted correspondingly, as is appreciable by persons skilled in the art. Further, as the rotor magnetic field augmentation functionality ceases with increased rotor speed, it behaves more like a conventional induction motor. Thus it may also be used in the generation mode just as well. Therefore, the above description and illustrations should not be taken as limiting the scope of the present invention.

That which is claimed is:

1. An induction motor having a rotor element and a stator element that sustains a stator rotating magnetic field; said rotor element having a rotor winding system that includes a plurality of winding units wound-distributed on a cylindrical periphery of a rotor lamination body for inducing a rotor magnetic field; each of said winding units comprising:

an induction subwinding having between two induction terminals thereof two legs of each a plurality of induction conductor segments; said induction subwinding inducing an emf across said two induction terminals for causing a rotor current in said rotor winding system that generates a basic induction component for said rotor magnetic field when said induction conductor segments move relative to said stator rotating magnetic field; and an augmentation subwinding having between two augmentation terminals thereof two legs of each a plurality of augmentation conductor segments aligned substantially parallel to said induction conductor segments; wherein said augmentation subwinding being wound such that said two legs of augmentation conductor segments are immediately next to each other and are positioned substantially mid-way between said two legs of induction conductor segments on said rotor lamination body cylindrical periphery; and said augmentation subwinding being electrically connected to said induction subwinding via said induction and augmentation terminals so as to produce by said rotor current an augmentation component for said rotor magnetic field; said augmentation component being substantially aligned with and oriented toward the same direction of said basic induction component; said augmentation component thereby enhancing field strength of overall rotor magnetic field.

2. The induction motor of claim 1 wherein said stator element includes a stator winding system for receiving an electrical power for sustaining said stator rotating magnetic field.

3. The induction motor of claim 2 wherein said electrical power received by said stator winding is a single-phase electrical power.

4. The induction motor of claim 2 wherein said electrical power received by said stator winding is a three-phase electrical power.

5. The induction motor of claim 2 wherein said electrical power received by said stator winding is a two-phase electrical power.

6. The induction motor of claim 1 wherein said stator rotating magnetic field sustained by said stator element is a two-pole magnetic field.

7. The induction motor of claim 1 wherein said stator rotating magnetic field sustained by said stator element is a four-pole magnetic field.

8. The induction motor of claim 1 wherein said stator rotating magnetic field sustained by said stator element is a six-pole magnetic field.

9. The induction motor of claim 1 wherein said stator rotating magnetic field sustained by said stator element is an eight-pole magnetic field.

* * * * *